United States Patent Office

3,829,528
Patented Aug. 13, 1974

3,829,528
METHOD OF PRODUCING RESORCINOL RESINS BY REACTING WITH N-METHYLOL CAPROLACTAM
Agu Yanovich Aarna, Karl Ritsovich Kiisler, Peep Gerkhardovich Kristyanson, and Juri Albert-Mikhaelovich Tanner, Tallin, U.S.S.R., assignors to Tallinsky Politekhnichesky Institut, Tallin, U.S.S.R.
No Drawing. Continuation of abandoned application Ser. No. 131,790, Apr. 6, 1971. This application Apr. 30, 1973, Ser. No. 355,966
Int. Cl. C08g 5/10
U.S. Cl. 260—841          8 Claims

ABSTRACT OF THE DISCLOSURE

A method of producing resorcinol resins, comprising polycondensation of resorcinol, alkylresorcinol compounds or of a mixture thereof, with N-methylolcaprolactam or with a mixture of N-methylolcaprolactam with N,N-dimethylcarbamide. The molar ratio of N-methylolcaprolactam with said phenolic compounds is equal to 0.3–1:1, respectively, while that of N-methylolcaprolactam with N,N-dimethylolcarbamide and with phenolic compounds is equal to 0.1–0.4:0.1–0.4:1, respectively. The polycondensation process occurs either in a solution or in a melt at a temperature of 30–100° C.

The herein-disclosed method is instrumental in producing practically anhydrous resorcinol resin featuring more homogeneous chemical structure thereof.

---

This is a continuation application of Ser. No. 131,790 filed Apr. 6, 1971, now abandoned.

The present invention relates to the field of high-molecular weight compounds, viz., the production of resorcinol resins. Said resins can find application as adhesives in the production of resorcinol cements suitable for adhering together a variety of construction and thermal-insulating materials.

Known in the art is a method of producing resorcinol resins from highly-reactive phenols of the resorcinol type (resorcinol, alkylresorcinol compounds, or a mixture of the two) by way of polycondensation of said phenolic compounds with a compound containing fixed formaldehyde, i.e., an aqueous formaldehyde solution. The process of polycondensation is carried out in the presence of compounds capable of forming molecular complexes with phenols through hydrogen bond, e.g. such compounds as acetone (cf. U.S.S.R. Author's Certificate No. 145354) or caprolactam (cf. U.S.S.R. Author's Certificate No. 183382).

All of said methods suffer from certain disadvantages inherent therein, such being as follows.

The use of aqueous formaldehyde introduces a large amount of water into the resin produced, whereby water elimination from the resin obtained in the presence of acetone proves to be impractical, and in the case of caprolactam it is highly laborious. Besides, the use of aqueous aldehyde under industrial conditions is undesirable from sanitary and hygiene aspects. Moreover, acetone having but slightly developed complexing properties, the resulting resorcinol resin exhibits non-homogeneous chemical structure which causes cements based upon such resorcinol resin to have inferior adhesive and cohesive properties.

It is therefore an object of the present invention to provide a method of producing resorcinol resins having a more homogeneous chemical structure.

Another object of the present invention is to provide a method which would dispense with the use of aqueous formaldehyde so as to obtain resorcinol resins practically free from water.

According to said and other objects the invention resides in carrying out the polycondensation of highly-reactive phenols of the resorcinol type (resorcinol, alkylresorcinol compounds or a mixture of the two) with compounds containing amide and methylol groups. As such compounds use is made, according to the invention, of N-methylolcaprolactam taken in a molar ratio thereof with the aforesaid phenolic compounds equal to 0.3–1:1 respectively, or use is also made of a mixture of N-methylolcaprolactam with N,N-dimethylolcarbamide in a molar ratio between N-methylolcaprolactam, N,N-dimethylolcarbamide and said phenolic compounds equal to 0.1–0.4:0.1–0.4:1, respectively. The process of polycondensation is carried out in a solution or melt at a temperature of 30–100° C.

In such compounds as N-methylolcaprolactam and N,N-dimethylolcarbamide the amide group exhibits pronounced complexing (electron-donating) properties with respect to phenols, while the methylol group is the donor of formaldehyde when the reaction of transhydroxymethylation occurs.

The proposed method makes it possible to dispense with the use of aqueous formaldehyde and to obtain practically dewatered resorcinol resins of a more homogeneous chemical structure.

To enhance the elasticity of the resin produced polycondensation is recommended to be carried out in the presence of polyamides taken in an amount of 5–30 parts by weight per 100 parts by weight of phenolic compounds.

To attain the required degree of polycondensation at low temperatures (30–50° C.) the process is recommended to be carried out in the presence of weak organic acids taken in an amount of 0.002–0.06 moles per mole of phenolic compounds, oxalic acid being most suitable for the purpose.

The herein-disclosed method of producing resorcinol resin is carried out as follows.

1 mole of molten or dissolved in organic solvents (glycerol, ethanol, acetone, etc.) resorcinol or alkylresorcinol compounds or a mixture of the two, is mixed with 0.3–1 mole, preferably 0.50–0.80 mole of powdered N-methylolcaprolactam which is gradually added to the phenolic compounds in such a manner that the temperature of the reaction mass is kept within 30–100° C., preferably 50–95° C.

Depending upon the conditions the reaction proceeds under (melt or solution) a solvent may be added to the resin obtained (to control the viscosity thereof) upon termination of the polycondensation process at a temperature of 50–70° C., the total amount of said solvent being taken at a rate of 10–90 parts by weight per 100 parts by weight of the starting phenol stock used. Thereupon the resin is cooled down to 40° C. and discharged from the processing apparatus into the container. The storage stability of the resin is 1 year.

Instead of N-methylolcaprolactam, a mixture thereof with N,N-dimethylcarbamide may be used, the molar ratio between N-methylolcaprolactam, N,N-dimethylcarbamide and the abovesaid phenolic compounds being equal to 0.1–0.4:0.1–0.4:1, preferably 0.1–0.3:0.2–0.3:1. With an increase in the content of N-methylolcaprolactam in the mixture, that of N,N-dimethylolcarbamide decreases correspondingly, and vice versa. The use of N-methylolcaprolactam in combination with N,N-dimethylcarbamide makes it possible to increase the ratio between the amount of fixed formaldehyde and that of the complexing groups. The production process of the herein-considered resin when utilizing said mixture, is carried out similarly to that described above.

To obtain resorcinol resins having a higher elasticity, there are added to the starting resorcinol stock prior to the polycondensation process, polyamides taken in an amount of 5–30 parts by weight per 100 parts by weight of the resorcinol stock.

As has been pointed out hereinbefore, to attain the required degree of polycondensation at low temperatures (30–50° C.) there are added to the original resorcinol stock prior to starting the polycondensation process, weak organic acids (oxalic, benzoic, citric, etc.) taken in an amount of 0.002–0.06 mole per mole of the resorcinol stock.

Using the resorcinol resins synthesized by the method proposed herein, there are produced adhesives suitable for adhering together a diversity of materials and possessing high adhesive and cohesive properties. Bonded joints resulting from the use of such adhesives exhibit by the following characteristics:

curing time at room temperature, hrs.: 24–48
curing time at 60° C., hrs.: 2–6
shear strength, kg./cm.$^2$.
    wood-to-wood joint: up to 110 depending upon kind of wood
    asbestos-cement-to-asbestos-cement: 40–50
    foamed-plastic-to-aluminum is restricted to foamed-plastic strength
curing shrinkage, percent: 2 max.
curing weight losses, percent: 8 max.

Cement-bonded joints obtained are water- and frost-proof and resistant to corrosive media. Cements based on the herein-considered resorcinol resin are applicable either without filling materials or with a variety of such (wood flour, gypsum plaster, powdered aluminum, quartz sand, powdered calcium silicate) depending upon the type of materials being bonded.

The present invention is explained below by way of examples of producing resorcinol resin.

EXAMPLE 1

A processing apparatus equipped with a mechanical stirrer and a heating element is charged with a mixture of alkylresorcinol compounds resulting from thermal processing of pyroshale and featuring the following weight percent composition: resorcinol 2.5; 5-methylresorcinol 35.9; 5-ethylresorcinol 11.2; 2,5-dimethylresorcinol 10.8; 4,5-dimethylresorcinol 15.1; 2,4,5-trimethylresorcinol 5.5; other alkyl-derivatives of resorcinol 19.0. Resorcinol stock is heated with stirring until a complete fusion thereof occurs. Thereupon powdered N-methylolcaprolactam is introduced batchwise into the processing apparatus at a rate of 0.6 mole per mole of resorcinol stock. The temperature of the reaction mixture is kept within 75–95° C. Once the entire amount of N-methylolcaprolactam has been introduced the reaction mixture is agitated at 85–95° C. during 1–1.5 hours. Then the reaction mixture is cooled down to 50–60° C. and acetone is added thereto in an amount of 30 parts by weight per 100 parts by weight of resorcinol stock. The reaction mass is stirred to obtain a homogeneous mixture and cooled dwn to approximately 40° C., the resulting resin is discharged from the processing apparatus into the container.

EXAMPLE 2

Resorcinol resin is synthesized in a similar way to Example 1, the sole difference being that resorcinol is used instead of a mixture of alkylresorcinol compounds.

EXAMPLE 3

Resorcinol resin is synthesized as described in Example 1, but 5-methylresorcinol alone is employed instead of a mixture of alkylresorcinol compounds.

EXAMPLE 4

An apparatus similar to that described in Example 1 is charged with the same mixture of alkylresorcinol compounds as in Example 1, glycerol being added thereto in an amount of 20 parts by weight per 100 parts by weight of resorcinol stock. The content of the processing apparatus is heated with stirring until a homogeneous solution is obtained. Further, powdered N-methylolcaprolactam (0.25 mole thereof per mole of the mixture of alkylresorcinol compounds) is introduced batchwise into the processing apparatus, followed by the same introduction of powdered N,N-dimethylolcarbamide (taken in the same molar ratio with resorcinol stock). The temperature of the reaction mixture is maintained within 75–95° C. The entire quantity of N,N-dimethylolcarbamide having been introduced, the reaction mixture is stirred at 85–95° C. during 1–1.5 hours. Then the mixture is cooled down to 60–70° C. and ethanol is added thereto in an amount of 20 parts by weight per 100 parts by weight of resorcinol stock. The reaction mass is stirred until a homogeneous mixture is obtained and cooled down to approximately 40° C., and the thus-obtained resin is discharged from the processing apparatus into the container.

EXAMPLE 5

Resorcinol resin is synthesized as described in Example 4 with the sole difference that the molar ratio between N-methylolcaprolactam, N,N-dimethylolcarbamide and alkylresorcinol compounds is equal to 0.1:0.35:1, respectively.

EXAMPLE 6

Resorcinol resin is synthesized as described in Example 4 with the only difference that the molar ratio of N-methylolcaprolactam with N,N-dimethylolcarbamide and with alkylresorcinol compounds is 0.4:0.15:1, respectively.

EXAMPLE 7

An apparatus similar to that described in Example 1 is charged with the same mixture of alkylresorcinol compounds as in Example 1, glycerol being added thereto in an amount of 30 weight parts per 100 weight parts of resorcinol stock. The contents of the process apparatus are heated with stirring until a homogeneous solution is obtained, whereupon 10 parts by weight of polycaprolactam per 100 parts by weight of resorcinol stock are added thereto. The mixture is stirred while being heated to 120° C. until the polycaprolactam is dissolved. Further, the mixture is cooled down to 70° C. and powdered N-methylolcaprolactam is added batchwise thereto in an amount of 0.5 mole per mole of resorcinol stock, the temperature of the reaction mixture being kept within 75–95° C. The entire amount of N-methylolcaprolactam having been introduced into the reaction mixture, the latter is stirred at 85–95° C. during 1–1.5 hours. Thereupon the mixture is cooled down to 60–70° C. and ethanol is added thereto in an amount of 20 weight parts per 100 weight parts of resorcinol stock. The reaction mass having been stirred to obtain a homogeneous mixture and cooled down to 40° C., the resulting resin is discharged from the processing apparatus into the container.

EXAMPLE 8

An apparatus similar to that described in Example 1 is charged with the same mixture of alyklresorcinol compounds as in Example 1. A 2-percent ethanol solution of oxalic acid is then prepared and introduced into the processing apparatus in an amount of 40 parts by weight per 100 parts by weight of alkylresorcinol compounds and the resulting mixture is stirred while being heated until a homogeneous solution is obtained. Further, the mixture is cooled down to 40° C. and powdered N-methylolcaprolactam is added batchwise thereto in an amount of 0.8 mole per mole of alkylresorcinol compounds, the temperature of the mixture being kept within 30–50° C.

After the entire quantity of N-methylolcaprolactam has been introduced into the apparatus the mixture is stirred at 40–50° C. during 3 hours. Then the resin obtained is discharged from the processing apparatus into the container.

Resorcinol resin as synthesized in the Examples mentioned hereinabove exhibits the following characteristics:

water content, percent: 6 max. (without dewatering after synthesis)
dry residue, percent: 80 min.
storage term, years: 1

The resin discussed herein is essentially a brown-colored viscous liquid containing no mechanical admixtures.

What is claimed is:

1. A method of producing resorcinol resins comprising reacting phenolic compounds selected from the group consisting of resorcinol, alkylresorcinol compounds and a mixture of resorcinol and alkylresorcinol compounds, with compounds selected from the group consisting of N-methylolcaprolactam, and a mixture of N-methylolcaprolactam with N,N-dimethylocarbamide the molar ratio of N-methylolcaprolactam to said phenolic compounds being equal to 0.3–1:1 and the ratio of N-methylolcaprolactam to N,N-dimethylolcarbamide to said phenolic compounds is equal to 0.1–0.4:0.1–0.4:1 respectively, said reaction being carried out either in a solution or in a melt at a temperature of 30–100° C. to form a polycondensation product.

2. A method as claimed in claim 1, wherein the reaction takes place in the presence of polyamides taken in an amount of 5–30 parts by weight per 100 parts by weight of said phenolic compounds.

3. A method as claimed in claim 1, wherein the reaction takes place in the presence of weak organic acids taken in an amount of 0.002–0.06 mole per mole of said phenolic compounds.

4. A method as claimed in claim 2, wherein the reaction takes place in the presence of weak organic acids taken in an amount of 0.002–0.06 mole per mole of said phenolic compounds.

5. A method as claimed in claim 3, wherein the weak organic acid is oxalic acid.

6. A method as claimed in claim 4, wherein the weak acid is oxalic acid.

7. A resorcinol resin prepared according to the method of Claim 1.

8. A resorcinol resin prepared according to the method of Claim 2.

References Cited

Chem. Abstracts, vol. 57, 1962, 8737i–8738a, Aarna et al.
Chem. Abstracts, vol. 66, 1967, 11402w, Arana et al.
Chem. Abstracts, vol. 73, 1970, 76347w, Aarna et al.
Chem. Abstracts, vol. 58, 14239a, Cada et al.

HOWARD E. SCHAIN, Primary Examiner

U.S. Cl. X.R.

161—198, 205, 215, 262; 260—17.2, 38, 51.5, 54